(12) United States Patent
Silvers

(10) Patent No.: US 8,061,197 B2
(45) Date of Patent: Nov. 22, 2011

(54) JIGGER

(75) Inventor: Michael Silvers, Chatswood (AU)

(73) Assignee: Howard Silvers & Sons Pty Ltd, Chatsworth (AU)

( * ) Notice: Subject to any disclaimer, the term of this patent is extended or adjusted under 35 U.S.C. 154(b) by 31 days.

(21) Appl. No.: 12/373,512

(22) PCT Filed: Jul. 11, 2007

(86) PCT No.: PCT/AU2007/000961
§ 371 (c)(1),
(2), (4) Date: Nov. 2, 2009

(87) PCT Pub. No.: WO2008/006158
PCT Pub. Date: Jan. 17, 2008

(65) Prior Publication Data
US 2010/0050766 A1  Mar. 4, 2010

(30) Foreign Application Priority Data

Jul. 11, 2006  (AU) .................... 2006903731

(51) Int. Cl.
*G01F 19/00* (2006.01)
(52) U.S. Cl. .......................................... 73/426

(58) Field of Classification Search ............... 73/426
See application file for complete search history.

(56) References Cited

U.S. PATENT DOCUMENTS

| | | | | |
|---|---|---|---|---|
| 244,883 | A | * | 7/1881 | Gantt .................. 73/426 |
| D22,768 | S | * | 9/1893 | Dungan ............... D10/46.3 |
| 534,037 | A | * | 2/1895 | Oas ..................... 246/378 |
| 566,067 | A | * | 8/1896 | Duck .................... 215/6 |
| 2,143,027 | A | * | 1/1939 | Perry .................. 215/374 |
| D229,917 | S | * | 1/1974 | Swett ................. D10/46.3 |
| 5,445,023 | A | | 8/1995 | Reed |
| D448,619 | S | * | 10/2001 | Pau .................... D7/503 |
| D468,220 | S | | 1/2003 | Harris ................ D10/46.2 |
| D491,019 | S | | 6/2004 | Marsden .............. D07/509 |
| D534,037 | S | * | 12/2006 | Oas .................... D7/507 |
| D589,752 | S | * | 4/2009 | Fetting ................ D7/510 |
| D615,363 | S | * | 5/2010 | Lion et al. ........... D7/524 |
| 2004/0195118 | A1 | | 10/2004 | Goralnik |

* cited by examiner

*Primary Examiner* — Lisa Caputo
*Assistant Examiner* — Jamel Williams
(74) *Attorney, Agent, or Firm* — Greenberg Traurig LLP

(57) ABSTRACT

A jigger system for measuring and dispensing accurate volumes of fluid, the system comprising a first jigger having a base and one or more walls extending upwardly from the base to define an interior cavity, the interior cavity being divided into two or more segments and being open at the top.

26 Claims, 10 Drawing Sheets

JIGGER

CROSS REFERENCES TO RELATED APPLICATIONS

This application claims the benefit under 35 U.S.C. §371 of PCT/AU2007/000961 filed Jul. 11, 2007, which claims the benefit of AU2006903731 filed Jul. 11, 2006, the entire contents of both of which are incorporated by reference herein.

FIELD OF DISCLOSURE

The disclosure relates to jiggers for measuring and dispensing fluids in particular to jiggers for measuring and dispensing spirits and liquors.

BACKGROUND ART

Both in bars and restaurants and in the home jiggers or measures are utilised to accurately and easily measure and dispense and or transfer precise amounts of alcohol into other containers. This is particularly important in creating mixed drinks or cocktails where several different types of alcohol are utilised to create a mixture. Frequently in this case, different measuring devices are needed to accurately measure and dispense either small or large amounts of alcohol that are required to make a mixed drink.

It is important to provide an easy way of measuring and dispensing various accurate amounts of alcohol. Inaccurate alcohol measurement and transfer can result in incorrect ratios of alcohol in mixed drinks and cocktails which not only impacts the taste of the drink but can be dangerous for the consumer.

SUMMARY OF THE DISCLOSURE

Disclosed is a jigger system for measuring and dispensing accurate volumes of fluid, the system comprising a first jigger having a base and one or more walls extending upwardly from the base to define an interior cavity, the interior cavity being divided into two or more segments and being open at the top, each segment being adapted to accurately measure a volume of fluid.

In one form the base includes a fitting to allow the first jigger to be removably attached with a second jigger.

In one form an elongate handle is positioned between the first jigger and the second jigger via respective fittings on each of the first and second jiggers.

In one form the elongate handle is adapted to be removably attached with three or more jiggers.

In one form the first jigger incorporates three or more separate interior segments.

In one form the first jigger and the second jigger each incorporate three or more segments.

BRIEF DESCRIPTION OF THE DRAWINGS

Embodiments of the jigger system will now be described, by way of example only, with reference to the accompanying drawings in which.

DETAILED DESCRIPTION OF PREFERRED EMBODIMENTS

Figure 1:
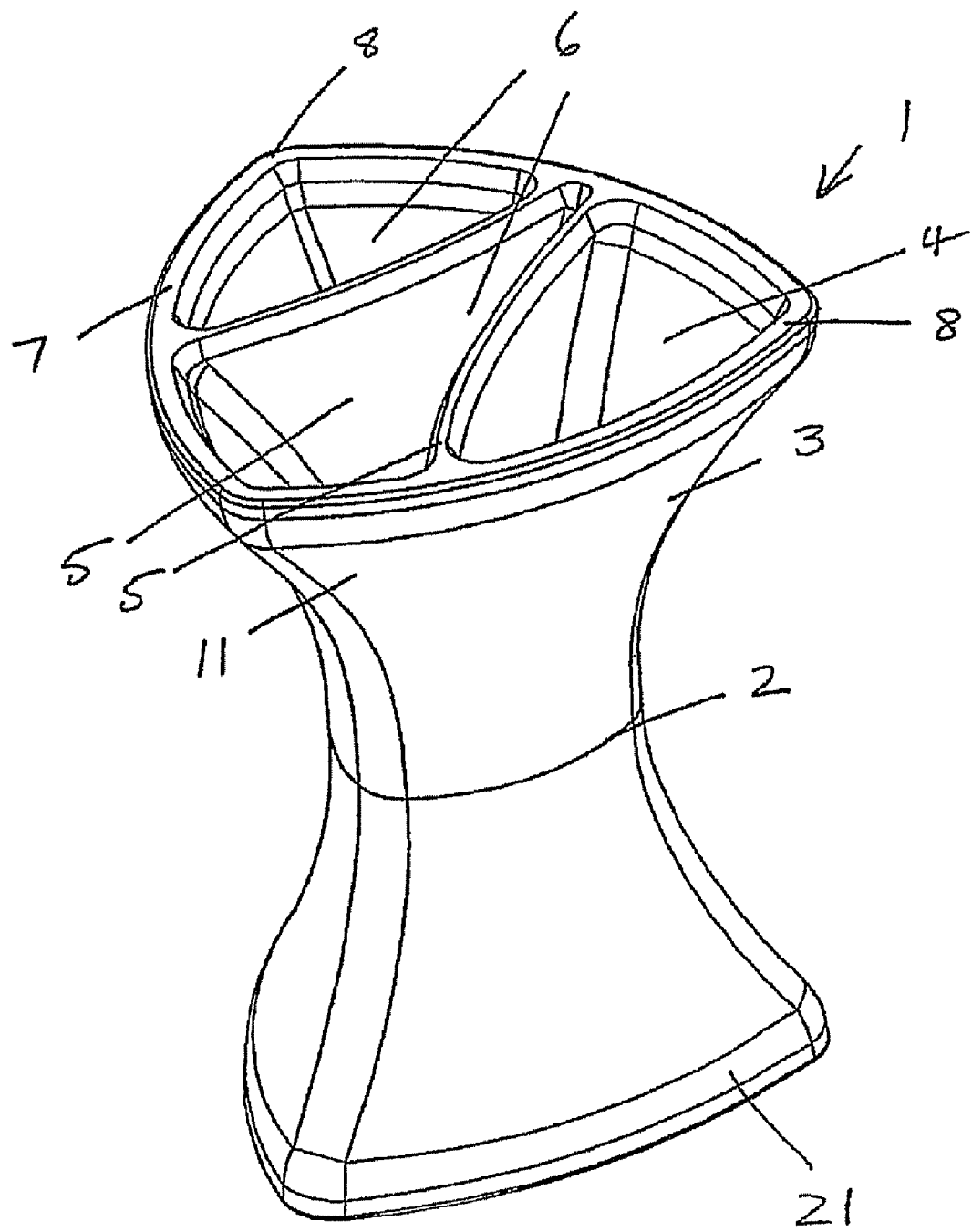
FIG. 1 shows a top perspective view of a first jigger system.
Figure 2:
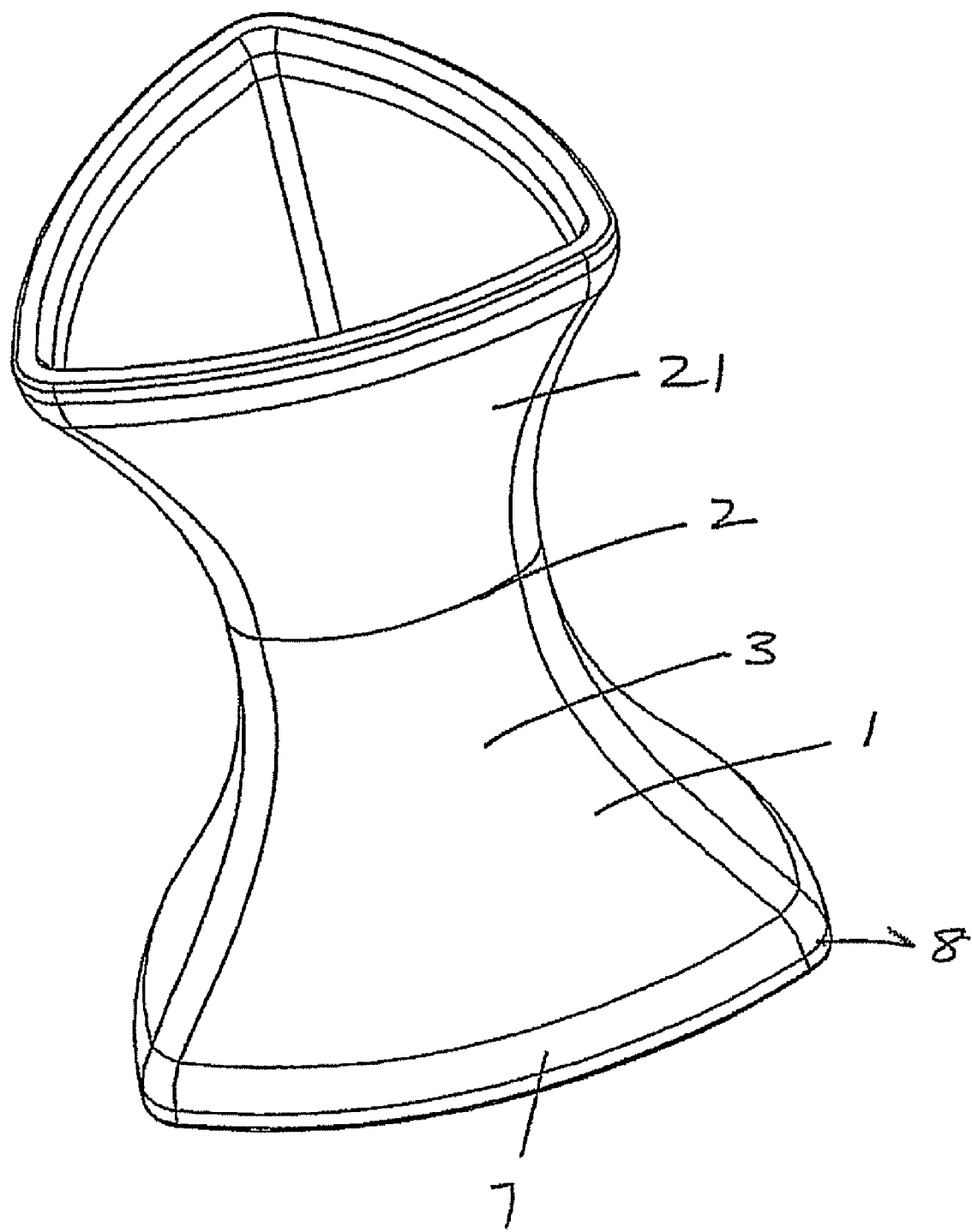
FIG. 2 is a bottom perspective view of the jigger system of FIG. 1.
Figure 3:
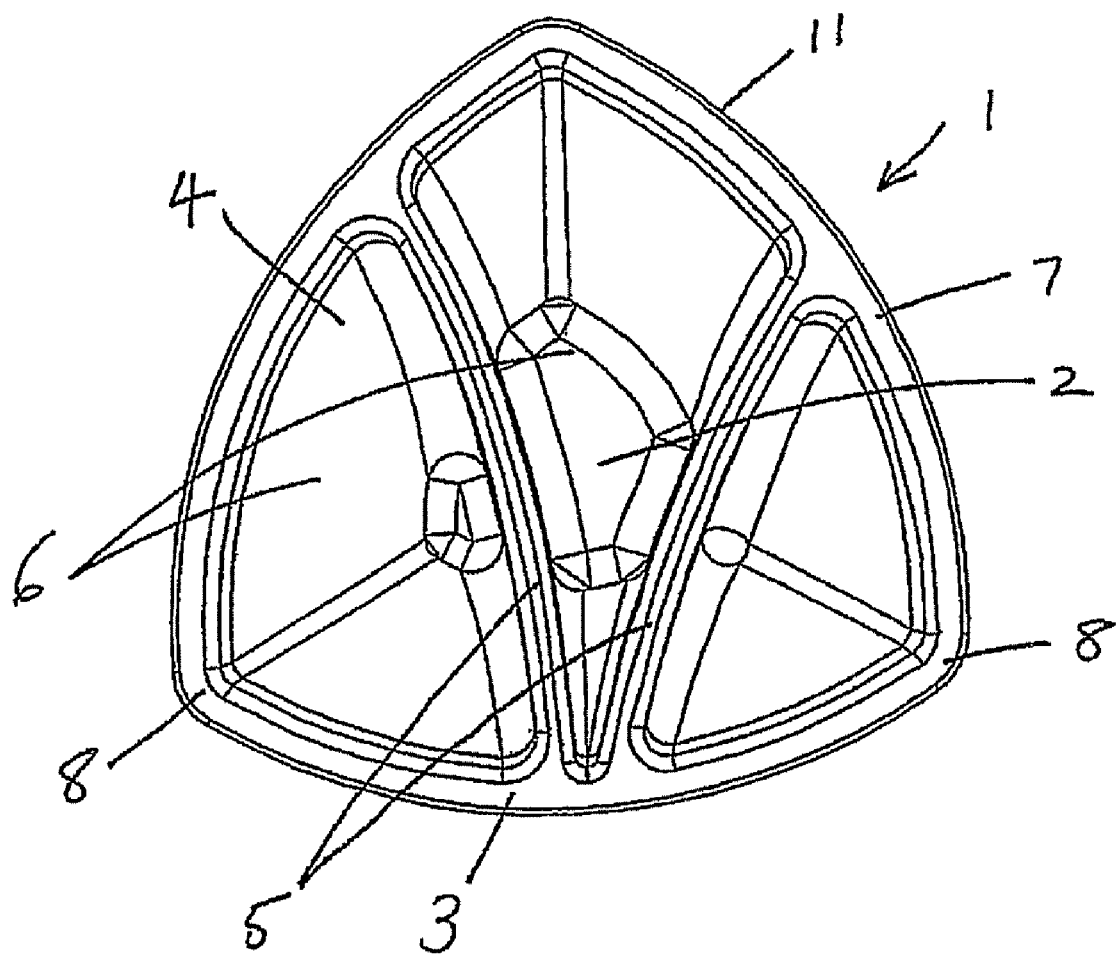
FIG. 3 is a top view of the jigger system of FIG. 1.
Figure 4:
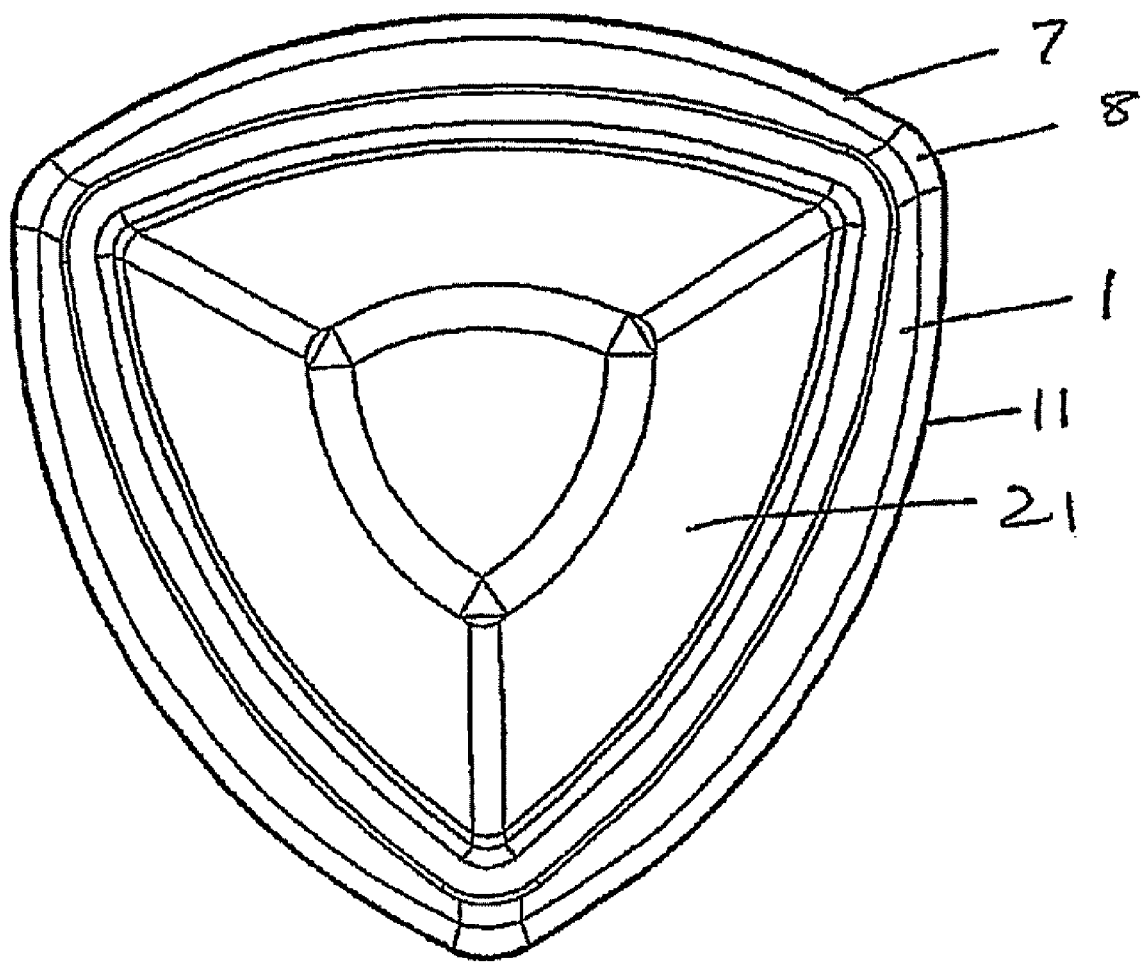
FIG. 4 is a bottom view of the jigger system of FIG. 1.
Figure 5:
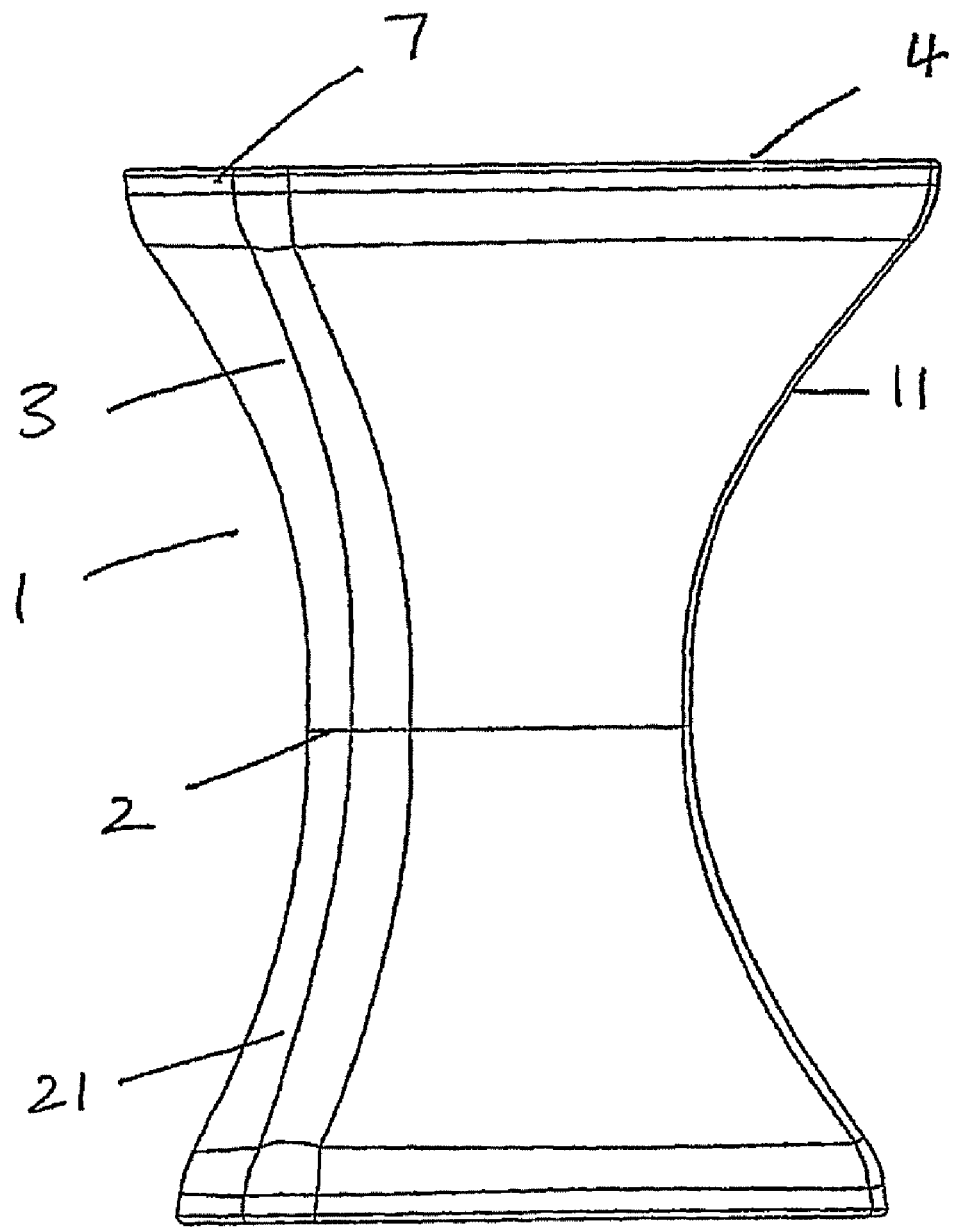
FIG. 5 is a side view of the jigger system of FIG. 1.
Figure 6:
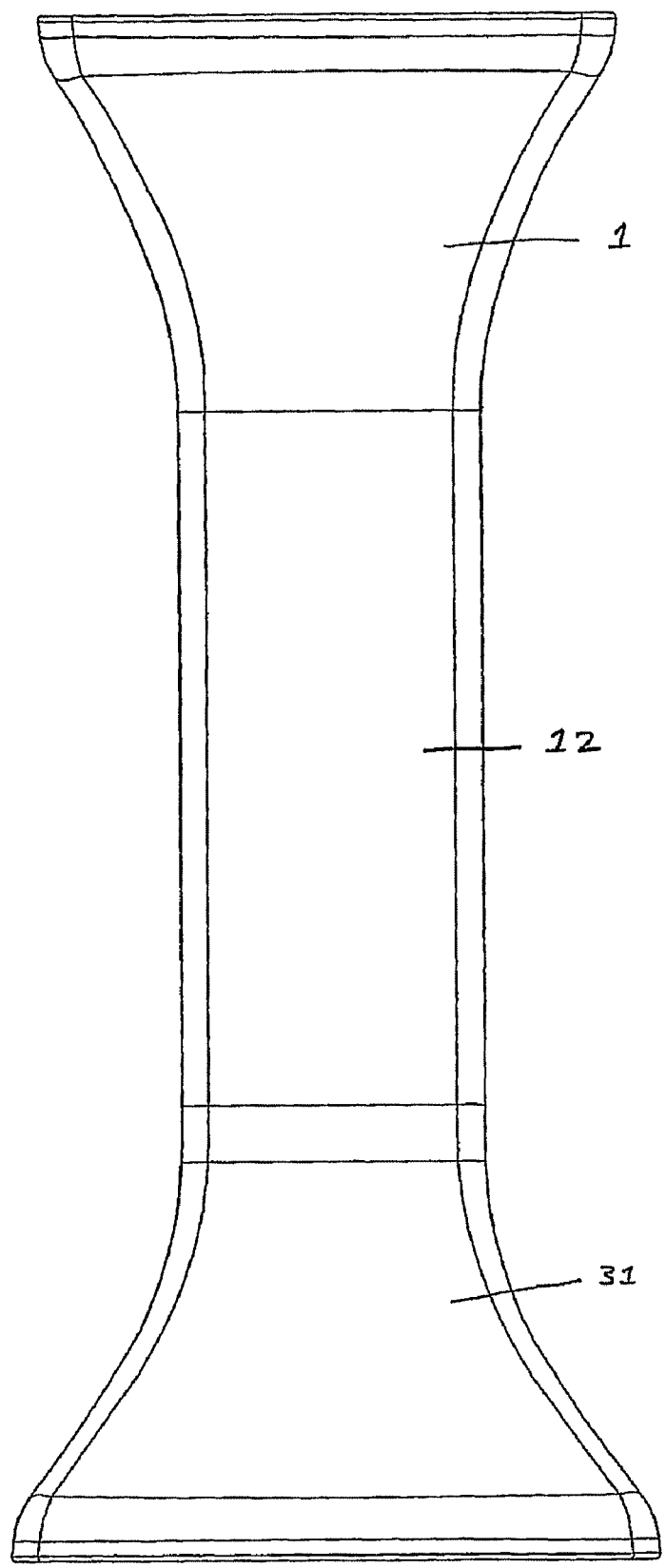
FIG. 6 is a side view of a second jigger system embodiment.
Figure 7:
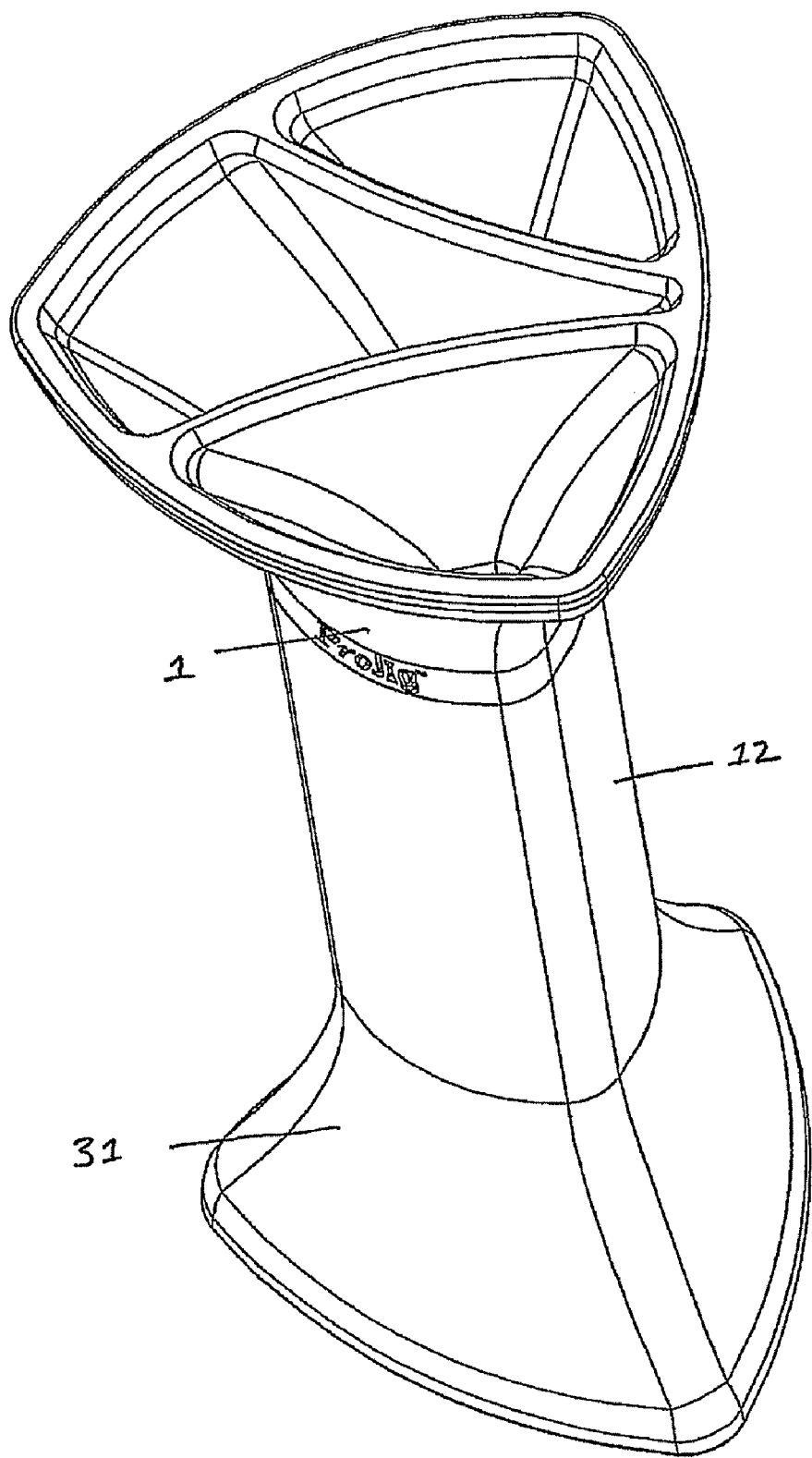
FIG. 7 is a top perspective view of the jigger system of FIG. 6.

Referring to the figures, disclosed is a jigger system 1 for measuring and dispensing accurate volumes of fluid. The first jigger 11 of jigger system 1 comprises a base 2 and one or more walls 3 which are designed to define an interior cavity 4. The interior cavity 4 is divided by means of interior walls 5 into a plurality of segments 6. Each segment 6 is designed to hold a particular accurate amount of fluid. The volume of fluid held by each segment 6 is varied from the other segments although the volumes can be equal. The first jigger 11 is open at the top to allow a user to pour the fluid from the segments 6 into a glass or other container.

The interior walls 5 also extend upwardly from the base 2 to separate off each of the segments.

The rim 7 of the first jigger 11 extends around the top of the interior cavity 4 and is adapted to allow ease of pouring. The rim 7 is shaped as a triangle, a rounded triangle, a diamond, square, rectangle or kite. The segments 6 are positioned such that each of the segments 6 has a tapered pouring lip 8. This pouring lip 8 allows fluids to be dispensed from any of the segments 6 without spillage.

Figure 8:
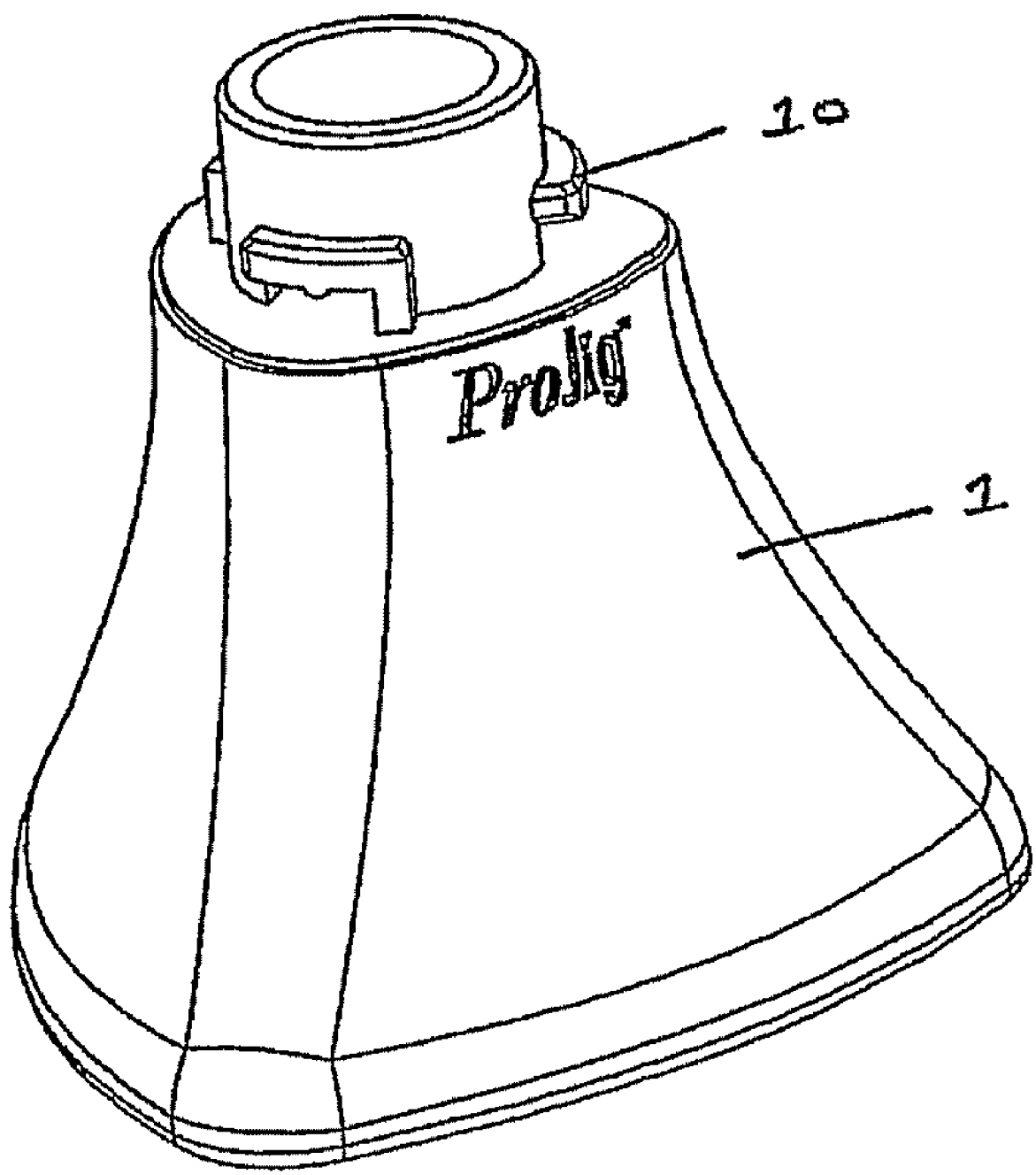
FIG. 8 is a close up view of a fitting of the first jigger embodiment.
Figure 9:
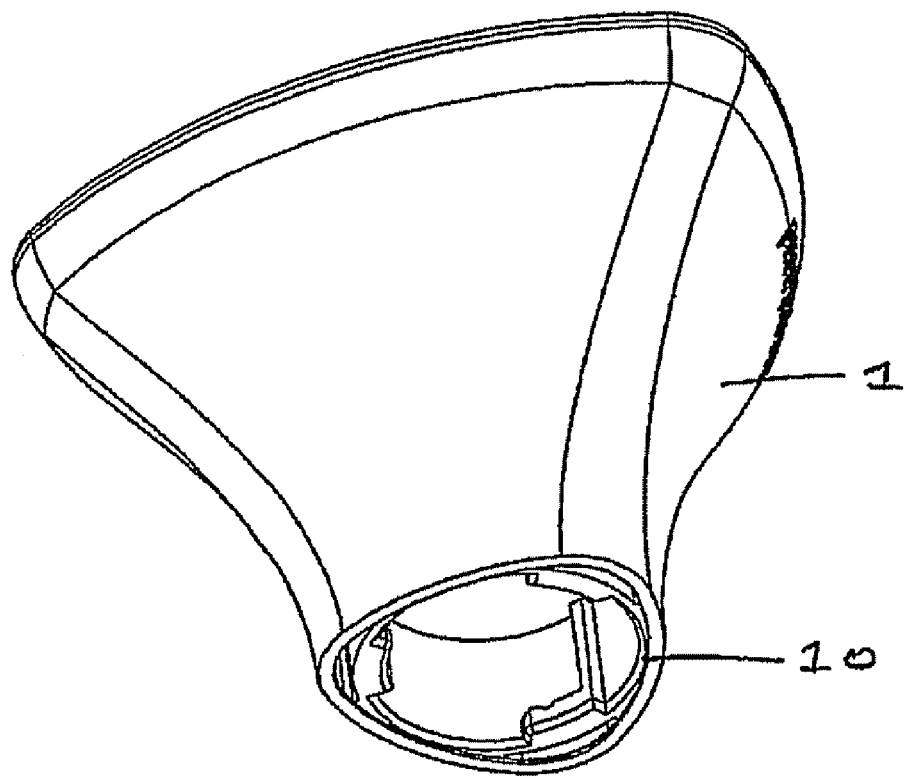
FIG. 9 is a close up view a fitting of the second jigger system embodiment.
Figure 10:
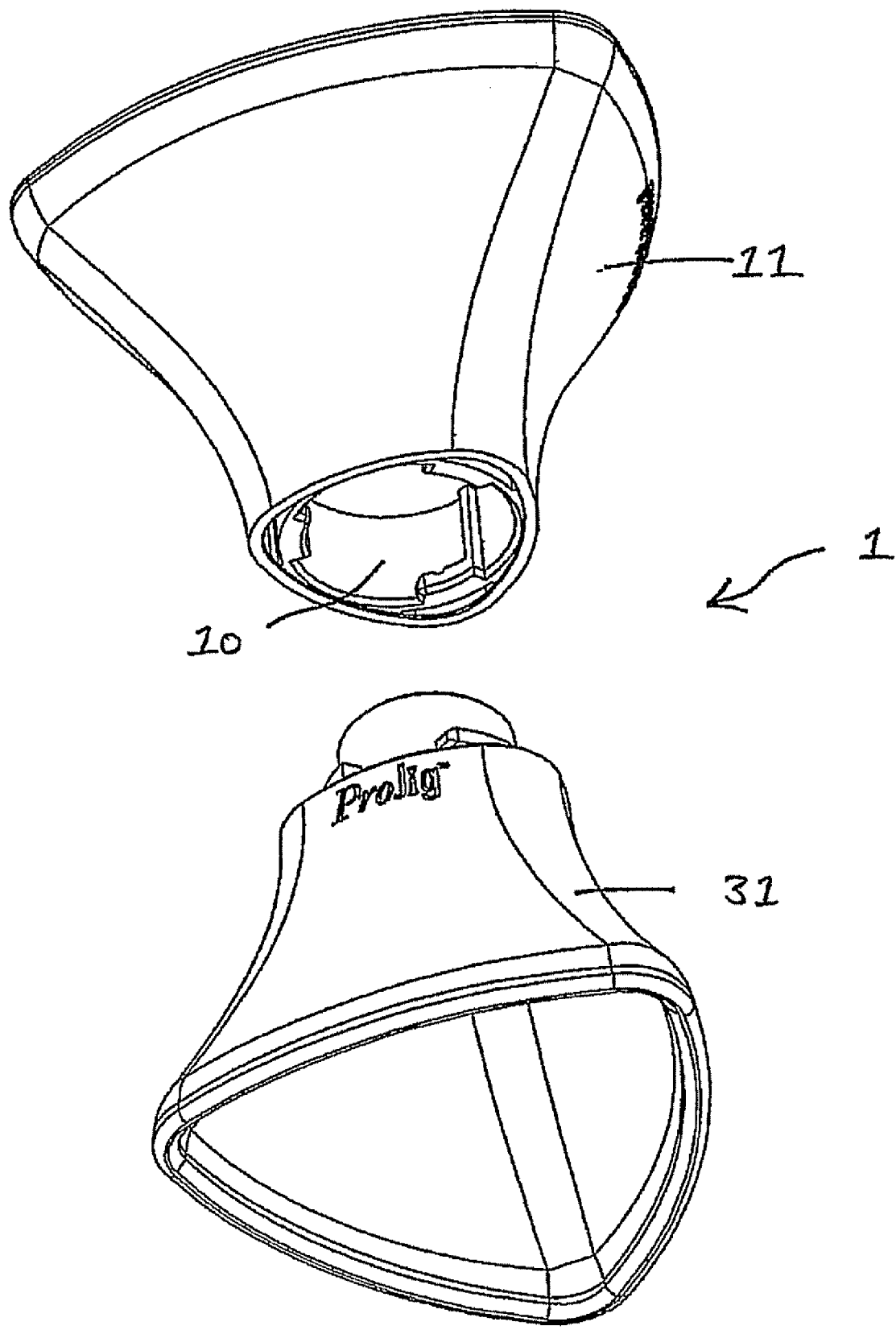
FIG. 10 is an exploded bottom perspective view of another embodiment of the jigger system.

The base 2 further comprises a fitting 10 as shown best in FIGS. 8 and 9 which is adapted such that the first jigger 11 can be affixed to another article. The fitting 10 can comprise a bayonet or screw fitting, a resistance fit or any other fitting system. As best shown in FIG. 10, the fitting 10 allows a second jigger 21 to be attached with the jigger 1. The second jigger 21 can have a single interior cavity with no segments and may be sized differently from the first jigger 11.

Alternately the second jigger 21 can comprise a jigger the interior of which is divided into more than one segment.

In one form the segments are designed to hold a combination of volumes ranging between 5 mL and 60 mL. For example, one jigger could be designed to hold 5 mL, 10 mL, and 15 mL with a total volume of 30 mL. Another jigger could be designed to hold 5 mL, 10 mL, 25 mL and 50 mL. For some markets the jiggers might be designed to hold 2 oz, ¾ oz, ½ oz, ¼ oz, and ⅛ oz. The jigger is designed to include a number of segments as is desirable for use in a particular jurisdiction. Numbers indicating volumes can also be moulded, adhered or otherwise associated with each segment.

The combination of two jiggers 1 and 21 allows a user to easily shift between different alcohols or between different volumes of alcohol when the jigger is used to mix drinks. Furthermore each of the jiggers can be easily swapped and connected with different jigger embodiments such that the requirements of different establishments or the legal standards of different jurisdictions can be met.

It can be seen that a combination of three or four jiggers or any practical number of jiggers joined by fittings and a handle would be possible.

As best shown in FIG. 11 the fitting 10 on the first jigger 11 can further be used to attach a handle 12 to the first jigger 11. The handle 12 includes a further handle fitting (not illustrated) which allows a second jigger 31 to be attached with the handle 12. The combination of first jigger 11, jigger 31 and handle 12 allows a user to easily switch between jigger volumes and alcohol types and allows a user to easily hold the jigger system 1 while measuring and dispensing liquid.

The jigger system 1 is comprised of plastic or metal or any other mouldable or formable substance or a combination thereof.

In the preceding description and in the claims which follow, except whether context requires otherwise due to express language or necessary implication, the word "comprised" or variations thereof is used in an inclusive sense, ie. to specify the presence of the state features but not to preclude the presence or addition of further features in various embodiments.

Variations and modifications can be made in respect of the system described above and defined in the following statement of claims.

The invention claimed is:

1. A jigger system for measuring and dispensing accurate volumes of fluid, the system comprising a first jigger having a base, multiple peripheral walls-extending from and sloping outwardly from the base to define an interior cavity, the interior cavity being divided into two or more segments by at least two interior walls and being open at the top, each segment being designed to accurately measure a volume of fluid; and the peripheral walls collectively forming a rounded triangular shape extending from the base, wherein each of three sides of the triangular shape meets a respective adjacent side at a point such that there are three points, each point being directed outwardly away from the interior cavity, and the walls being connected such that the peripheral walls form a spout at each respective point for each respective segment.

2. A jigger system as defined in claim 1, wherein the base includes a fitting to allow the first jigger to be removably attached with a second jigger.

3. A jigger system as defined in claim 2, wherein an elongate handle is positioned between the first jigger and the second jigger.

4. A jigger system as defined in claim 3, wherein the elongate handle is adapted to be removably attached with three or more jiggers.

5. A jigger system as defined in claim 1, the first jigger incorporating three or more separate interior segments.

6. A jigger system as defined in claim 2, wherein the first jigger and the second jigger each have three or more segments.

7. A jigger system as defined in claim 1, wherein the segments are designed to measure and hold specific and varied amounts of fluid.

8. A jigger system for measuring and dispensing accurate volumes of fluid, the system comprising a first jigger having a base, multiple peripheral walls extending from and sloping outwardly from the base to define an interior cavity, the interior cavity being divided into two or more segments and being open at the top, each segment being designed to accurately measure a volume of fluid; and the peripheral walls collectively forming a shape with distinct different sides wherein each of the distinct different sides of the shape meets a respective adjacent distinct side at a point such that there are multiple separate points, each point being directed outwardly away from the interior cavity, and the walls being connected such that the peripheral walls form a spout at each respective point for each respective segment.

9. A jigger system as defined in claim 1, wherein the base includes a fitting to optionally allow a first configuration with the first jigger to be removably attached with a second jigger, and optionally a second configuration having an elongate handle removable attached and positioned between the first jigger and the second jigger.

10. A jigger system as defined in claim 8, wherein the base includes a fitting to optionally allow a first configuration with the first jigger to be removably attached with a second jigger, and optionally a second configuration having an elongate handle removable attached and positioned between the first jigger and the second jigger.

11. A jigger system as defined in claim 1, wherein the peripheral wall includes a pouring lip, the pouring lip being tapered, and being inside the outer periphery, the outer periphery being a side which extends as a single unbroken line from point to point.

12. A jigger system as defined in claim 1, wherein the internal walls engage the peripheral walls, and the internal walls are curved from one end of engagement with a first peripheral wall to another end for engagement at their end of a different peripheral wall.

13. A jigger system as defined in claim 8, wherein the internal walls engage the peripheral walls, and the internal walls are curved from one end of engagement with a first peripheral wall to another end for engagement at their end of a different peripheral wall.

14. A jigger system as defined in claim 1, wherein the internal walls engage the peripheral walls, and the internal walls extend from one end of engagement with a first peripheral wall to another end for engagement at their end of a different peripheral wall, such that at least two segments form triangulated segments wherein at least two of the walls of the segments are relatively curved.

15. A jigger system as defined in claim 1, wherein the internal walls engage the peripheral walls, and the internal walls are curved from one end of engagement with a first peripheral wall to another end for engagement at their end of a different peripheral wall, such that at least two segments form triangulated segments wherein three of the walls of the segments are relatively curved.

16. A jigger system as defined in claim 14 wherein the two triangulated segments are spaced from each other by an intervening non-triangular segment.

17. A jigger system as defined in claim 15 wherein the two triangulated segments are spaced from each other by an intervening non-triangular segment.

18. A jigger system for measuring and dispensing accurate volumes of fluid, the system comprising a first jigger having a base, multiple peripheral walls extending from and sloping outwardly from the base to define an interior cavity and being open at the top, each segment being designed to accurately measure a volume of fluid; and the peripheral walls collectively forming a shape with distinct different sides wherein each of the distinct different sides of the shape meets a respective adjacent distinct side at a point such that there are multiple separate points, each point being directed outwardly away from the interior cavity, and second jigger having a base, multiple peripheral walls extending from and sloping outwardly from the base to define an interior cavity, the interior cavity being open at the end remote from the base, and the peripheral walls collectively forming a shape with distinct different sides wherein each of the distinct different sides of the shape meets a respective adjacent distinct side at a point such that there are multiple separate points, each point being directed outwardly away from the interior cavity, each point being directed outwardly away from the interior cavity.

19. A jigger system as defined in claim 18, wherein the base includes a fitting to optionally allow a first configuration with the first jigger to be removably attached with a second jigger, and optionally a second configuration having an elongate handle removable attached and positioned between the first jigger and the second jigger, and wherein the handle has peripheral walls collectively forming a shape with distinct different sides wherein each of the distinct different sides of the shape meets a respective adjacent distinct side at a point such that there are multiple separate points, and the wall align with the walls of the jigger when the handle is in attachment.

20. A jigger system as defined in claim 19, wherein the peripheral walls of the first jigger are formed such that when the first and second jiggers are connected with or without the intervening handle, the outer peripheries of the jiggers are in a mirror relationship with each other.

21. A jigger system as defined in claim 18 wherein the interior cavity is divided into two or more segments.

22. A jigger system for measuring and dispensing an accurate volume of fluid, the system comprising a first jigger having a base, multiple peripheral walls extending from and sloping outwardly from the base to define an interior cavity and being open at the top, thereby to form a segment being designed to accurately measure a volume of fluid; and the peripheral walls collectively forming a shape with distinct different sides wherein each of the distinct different sides of the shape meets a respective adjacent distinct side at a point such that there are multiple separate points, each point being directed outwardly away from the interior cavity, and wherein the peripheral walls includes a pouring lip, the pouring lip being tapered thereby to permit fluid dispensing from each segment in a manner of minimizing spillage, and the walls being connected such that the peripheral walls form a spout at each respective point for the segment.

23. A jigger system as defined in claim 22 including a second jigger having a base, multiple peripheral walls extending from and sloping outwardly from the base to define an interior cavity, the interior cavity being open at the end remote from the base, and the peripheral walls collectively forming a shape with distinct different sides wherein each of the distinct different sides of the shape meets a respective adjacent distinct side at a point such that there are multiple separate points, each point being directed outwardly away from the interior cavity, and wherein the peripheral walls include a pouring lip, and the pouring lip being tapered thereby to permit fluid dispensing from each segment in a manner of minimizing spillage.

24. A jigger system as defined in claim 22 wherein in the first jigger the interior cavity is divided into two or more segments by at least two interior walls and the edges of the interior walls ending in a taper.

25. A jigger system as defined in claim 23 wherein in the first jigger the interior cavity is divided into two or more segments by at least two interior walls and the edges of the interior walls ending in a taper.

26. A jigger system as defined in claim 23 wherein in the second jigger the interior cavity is divided into two or more segments by at least two interior walls and the edges of the interior walls ending in a taper.

* * * * *